(12) United States Patent
Zaldivar et al.

(10) Patent No.: US 8,551,287 B2
(45) Date of Patent: Oct. 8, 2013

(54) HYBRID ADHESIVE

(75) Inventors: Rafael J. Zaldivar, Huntington Beach, CA (US); James P. Nokes, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 291 days.

(21) Appl. No.: 12/896,905

(22) Filed: Oct. 3, 2010

(65) Prior Publication Data

US 2012/0082851 A1 Apr. 5, 2012

(51) Int. Cl.
| | |
|---|---|
| B29C 65/00 | (2006.01) |
| B32B 37/00 | (2006.01) |
| B32B 38/10 | (2006.01) |
| B32B 38/04 | (2006.01) |
| B32B 17/10 | (2006.01) |
| C09J 163/00 | (2006.01) |

(52) U.S. Cl.
USPC ......... 156/330; 156/249; 156/273.3; 428/409

(58) Field of Classification Search
USPC .................. 156/249, 273.3, 330; 428/409
See application file for complete search history.

(56) References Cited

U.S. PATENT DOCUMENTS

| 5,643,390 A * | 7/1997 | Don et al. ................. 156/307.1 |
| 2006/0182949 A1 * | 8/2006 | Salnikov et al. ............. 428/327 |

OTHER PUBLICATIONS

M. Moravej et al., Properties of an Atmospheric Pressure Radio-Frequency Argon and Nitrogen Plasma, Institute of Physics Publishing, Feb. 24, 2006, pp. 204-210, UK.

Andreas Schutze et al., The Atmospheric-Pressure Plasma Jet: A Review and Comparison to Other Plasma Sources, IEEE Transactions on Plasma Science, Dec. 1998, pp. 1685-1694, vol. 26, No. 6, IEEE, USA.

R.J. Zaldavar et al., Effect of Processing Parameter Changes on the Adhesion of Plasma-Treated Carbon Fiber Reinforced Epoxy Composites., Journal of Composite Materials, Dec. 2010, pp. 1435-1453, vol. 44, No. Dec. 2010, UK.

R.J. Zaldavar et al., The Effect of Atmospheric Plasma Treatment on the Chemistry, Morphology, and Resultant Bonding Behavior on a Pan-Based Carbon Fiber-Reinforced Epoxy Composite, Journal of Composite Materials, Feb. 2010, pp. 137-156, vol. 44, No. Dec. 2010, UK.

R. J. Zaldavar et al., Surface Preparation for Adhesive Bonding of Polycyanuarates-Based Fiber-Reinforced Composites Using Atmospheric Plasma Treatment, Journal of Applied Polymer Science, 2010, pp. 1-44, John Wiley and Sons, USA.

* cited by examiner

*Primary Examiner* — Michael Orlando
(74) *Attorney, Agent, or Firm* — Paul D. Chancellor; Ocean Law (57) ABSTRACT

A hybrid adhesive incorporating cyanate ester and/or epoxy materials and utilizing atmospheric plasma treatment provides stronger, more reliable joints in structural composite parts.

11 Claims, 10 Drawing Sheets

| PART | EXEMPLARY MATERIAL CATEGORIES | EXEMPLARY |
|---|---|---|
| First Substrate | Polycyanurate Cyanate ester | Cyanates Tencate RS3C Tencate 1515 Hexcel 954-3 |
| | | Unbennefitted epoxies Tencate RS36 Hexcel M76 Hexcel 8552 |
| | Fibers | Carbon fibers Pan-based glass fiber Pitch-based glass fiber Organic fibers |
| Second Substrate | Polycyanurate Cyanate ester | Cyanates Tencate RS3C Tencate 1515 Hexcel 954-3 |
| | | Unbennefitted epoxies Tencate RS36 Hexcel M76 Hexcel 8552 |
| | Fibers | Carbon fibers Pan-based glass fiber Pitch-based glass fiber Organic fibers |
| First epoxy layer | Epoxy benefitted by atmospheric plasma treatment | Toughened epoxy Tetrafunctional epoxies Epoxies cured at high temperature |
| | Hardener | Polyamine hardners |
| Second epoxy layer | Epoxy benefitted by atmospheric plasma treatment | Toughened epoxy Tetrafunctional epoxies Epoxies cured at high temperature |
| | Hardener | Polyamine hardners |
| Third epoxy layer | Epoxy | Epoxies cured at low temperature such as at room temperature |

HYBRID ADHESIVE

BACKGROUND OF THE INVENTION

1. Field of the Invention

The invention relates to manufactures, compositions of matter, and processes. In particular, the invention relates to a hybrid adhesive and systems and methods using the adhesive.

2. Discussion of the Related Art

Advanced composite structures utilize adhesive joints to minimize weight and part counts. These joints are typically fabricated with epoxy resin adhesives that are often the strength limiting factor for the entire structure.

Adhesive joint properties are strongly influenced by the surface preparation method and the degree of care used in carrying out the method steps. Achieving consistently high adhesive bond strengths enables production of better performing composite structural parts including one or more of reduced weight, increased strength, and less uncertainty.

Conventional adhesives and adhesive systems can be much improved to the extent the adhesives and related surface preparation methods are improved.

SUMMARY OF THE INVENTION

The present inventors ("inventors") have shown that an atmospheric plasma treatment process is an excellent method for the surface preparation of graphite epoxy composites prior to bonding. Experimental test results demonstrate strength improvements in some cases exceeding 50% in comparison to known surface preparation techniques. The inventors' studies show the primary mechanism for these strength improvements is the incorporation of specific functional groups on the surface of the composite.

The concentration of these species incorporated into the surface of a cured part treated with atmospheric plasma correlates with increases in strength of an epoxy bonded joint. These activated groups are believed to subsequently covalently bond to the epoxy adhesive yielding substantial improvements in bond performance during structure fabrication along with substantial increases in fracture toughness and bond durability.

However, most composite structures currently used for space applications utilize a cyanate ester matrix material, not epoxy. Cyanate ester composites have many improved properties when compared with epoxies used in similar applications. These include less moisture absorption, reduced microcracking and excellent dimensional stability while maintaining identical processing requirements. Unfortunately, the inventors' studies also show plasma treated cyanate ester composites are improved to a much lesser degree as compared with selected epoxies that are plasma treated. The chemical structure that contributes to many of these improved properties also makes cyanate ester resins more resistant to forming the bond enhancing species.

Notably, not all epoxies are similarly benefitted by atmospheric plasma treatment. For this reason, some embodiments of the present invention include composites made with unbenefitted epoxies rather than cyanate ester. Embodiments of the invention describing cyanate ester type composites below should be read, where appropriate, to include not only a cyanate ester composite, but, in the alternative, an unbenefitted epoxy composite.

This invention describes, inter alia, how to fabricate a tailored hybrid composite system with improved bond performance. The invention takes advantage of a secondary surface layer or film that can be co-cured with the substrate and is more prone to forming high concentrations of the bond enhancing active species during atmospheric plasma treatment than the initial unmodified system. This hybrid adhesive improves strength without compromising the superior properties of cyanate ester composites. As discussed below, various embodiments of the invention benefit from cyanate ester composites' inherent properties while exploiting the improvements available through use of atmospheric plasma treatment.

In an embodiment, a cyanate ester composite is fabricated using standard methods such as conventional autoclave processing and conventional lamination processes. However, the areas of the composite that will be bonded are identified prior to curing the composite. The bond areas are laminated or sprayed with a thin film of material(s) that is more prone to plasma activation than the substrate. The bond area, and in some embodiments areas adjacent to the bond area, is then covered with peel ply while the rest of the composite is processed using standard preparation techniques such as autoclave processing.

While the peel ply aids in forming a repeatable surface, it can leave contaminates behind that reduce bond strength. However, plasma treatment typically removes such contaminates and reduces data scatter while increasing the concentration of functional species on the modified surface. As the plasma treated surface leads to a significant increase in bond strength, the cyanate to epoxy interface could be expected to become the weak link. Surprisingly, the tailored system also produces cyanate to epoxy bonds that are also significantly stronger than expected.

The large increases in functional species on the modified layer allow a sharp increase in bond strength that is currently unavailable for a pure cyanate ester composite. In addition, co-reacting a thin film epoxy and cyanate ester interface significantly improves the weakest interface in the system.

When the part is fully cured, it is removed from the curing apparatus and the peel ply removed. In some embodiments the part is less than fully cured when the peel ply is removed. Removal of the peel plies exposes a thin layer, in some embodiments less than 1 mil, of resin that is "co-reacted" onto the surface of the cyanate ester matrix or substrate.

Notably, the degree of chemical reaction between the cyanate ester and the epoxy overlay can be controlled to optimize the chemical reaction. Surprisingly, the subsequent cyanate ester-epoxy bond in the co-reacted region is typically stronger than for a single component resin system.

Localized "atmospheric" plasma treatment is performed on the modified surface exposed by the peel ply. Because the oxygen plasma preferentially incorporates the active functional groups into this new surface, the concentration can be increased in comparison to a pure cyanate ester composite which is less susceptible to plasma treatment bond enhancement.

The length of time the epoxy rich surface is exposed to the atmospheric plasma controls the concentration of functional species formed. This provides a well behaved method of increasing the concentration of functional species incorporated in the epoxy layer. The average strength of this tailored system after 12 passes of plasma exposure results in lap shear strengths of approximately 3791 psi (with a high of 4150 psi) as compared to 2600 psi for a pure plasma-treated cyanate system.

These results demonstrate an increase in strength of over 60% (85% increase over standard surface prep). Further, strength test data collected for tailored system samples show less scatter than similar data collected from samples using standard surface preparation techniques.

As can be seen, the disclosed localized treatment of bonded surfaces offers a new class of structural composites having improved bond strengths and durability while maintaining desirable inherent properties of the bulk material along with standard processing practices and tooling used for cyanate ester composite manufacturing.

BRIEF DESCRIPTION OF THE DRAWINGS

The present invention is described with reference to the accompanying figures. These figures, incorporated herein and forming part of the specification, illustrate the present invention and, together with the description, further serve to explain the principles of the invention and to enable a person skilled in the relevant art to make and use the invention.

DETAILED DESCRIPTION OF THE PREFERRED EMBODIMENTS

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

Figure 1:
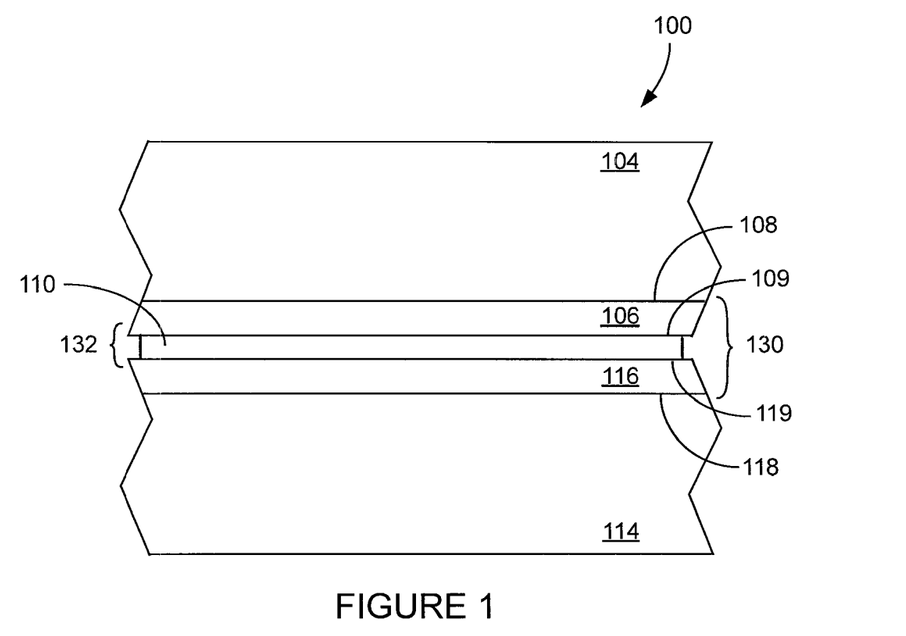
FIG. 1 shows a cross-section of a hybrid adhesive joint in accordance with the present invention.

FIG. 1 shows a hybrid adhesive joint in accordance with the present invention 100. First and second substrates 104, 114 are held together by a hybrid adhesive system 130 including substrate joints 108, 118. Substrate joints 108, 118 join the substrates 104, 114 to respective epoxy layers 106, 116. An assembly joint 132 includes assembly joint interfaces 109, 119 and joins the epoxy layers 106, 116.

Figure 2A:
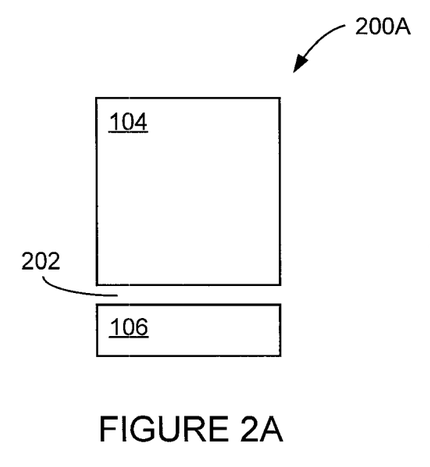
FIGS. 2A-B show the parts of a first substrate joint of the hybrid adhesive joint of FIG. 1 before and after joint formation.
Figure 2B:
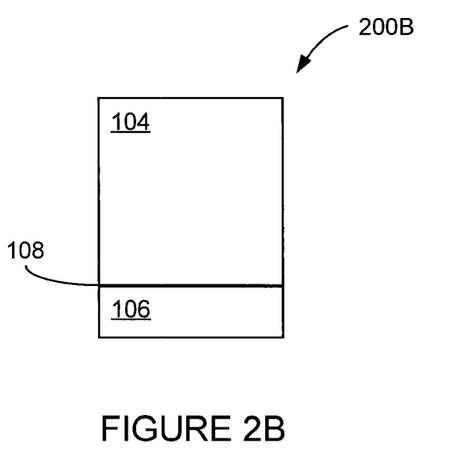

FIG. 2A shows the parts of the first substrate joint prior to joint formation 200A. FIG. 2B shows the parts of the first substrate joint after the joint is formed 200B. The first substrate joint 108 is formed after the epoxy layer 106 is brought into intimate contact with the substrate 104, eliminating the gap 202 between the parts.

Figure 3A:
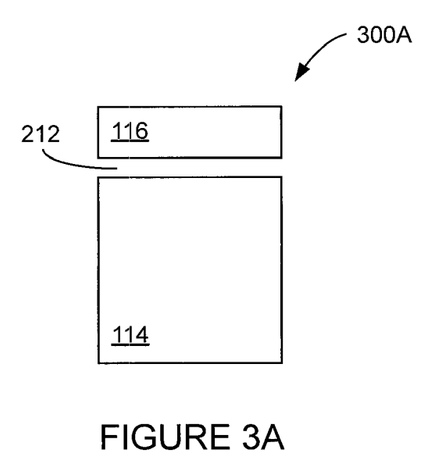
FIGS. 3A-B show parts of the second substrate joint of the hybrid adhesive joint of FIG. 1 before and after joint formation.
Figure 3B:
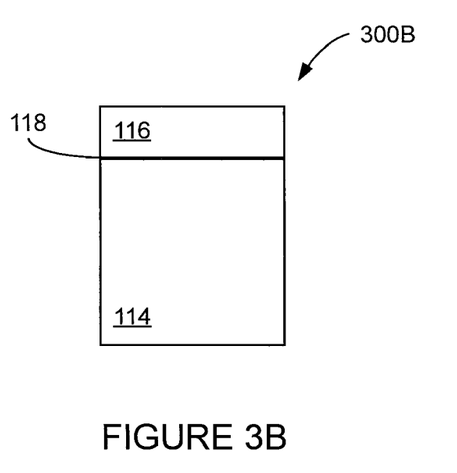

FIG. 3A shows parts of the second substrate joint prior to joint formation 300A. FIG. 3B shows the parts of the second substrate joint after the joint is formed 300B. The second substrate joint 118 is formed after the epoxy layer 116 is brought into intimate contact with the substrate 114, eliminating the gap 212 between the parts.

Figure 4A:
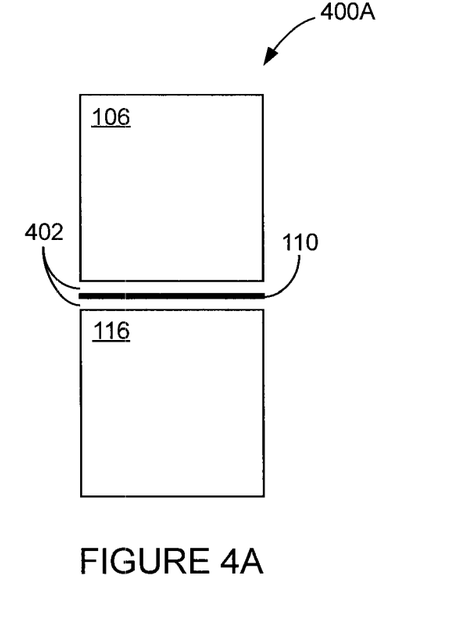
FIGS. 4A-B show parts of the assembly joint of the hybrid adhesive joint of FIG. 1 before and after joint formation.
Figure 4B:
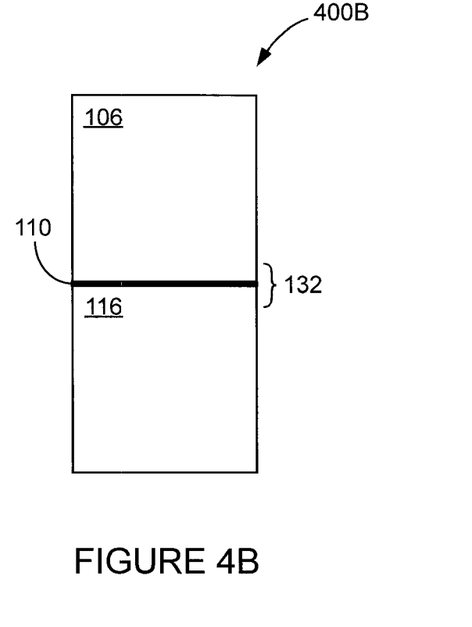

FIG. 4A shows parts of the assembly joint prior to joint formation 400A. FIG. 4B shows the parts of the assembly joint after the joint is formed 400B. The assembly joint 132 is formed when a third epoxy layer 110 is brought into intimate contact with the adjoining first and second epoxy layers 106, 116 eliminating the gaps 402 between these layers.

Figure 5:
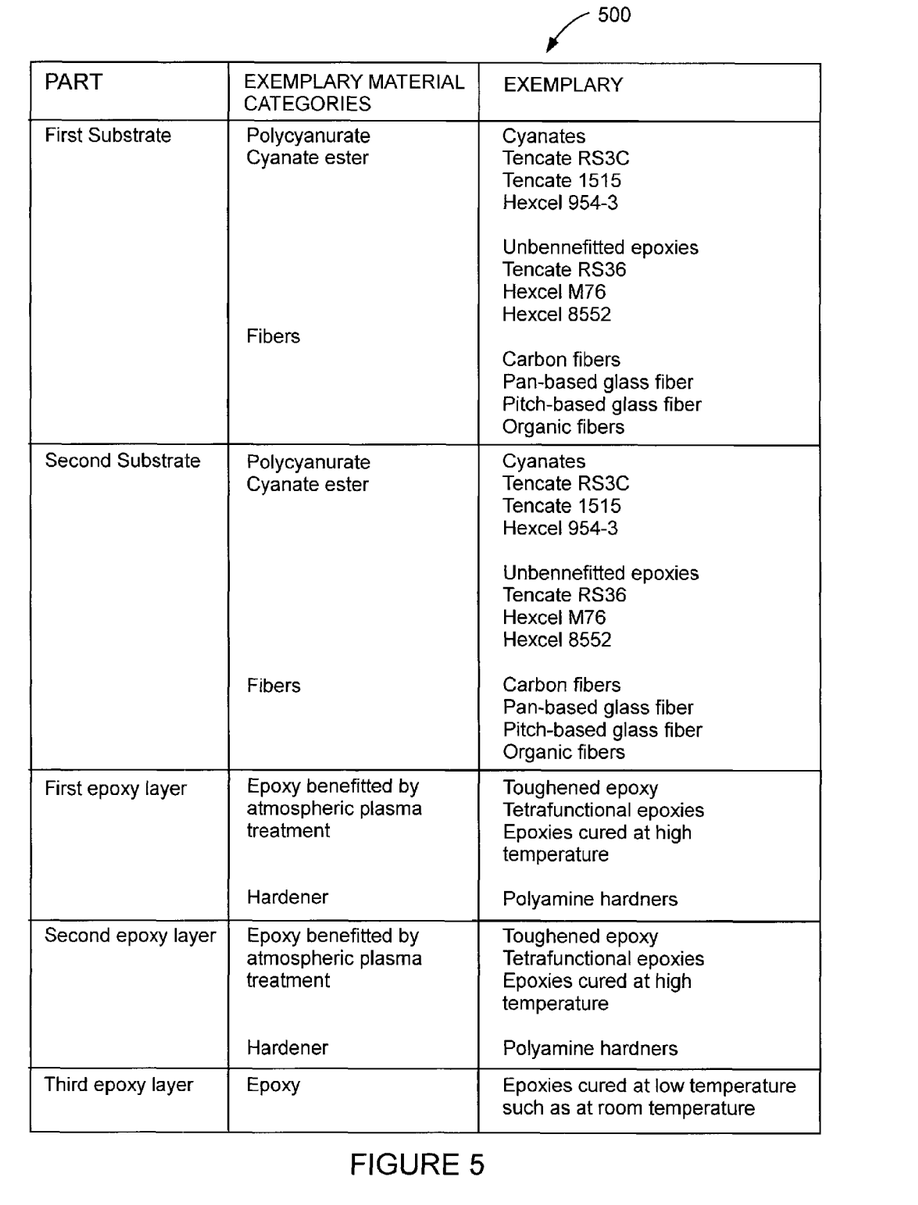
FIG. 5 shows materials of construction used in conjunction with the hybrid adhesive joint of FIG. 1.

FIG. 5 shows materials of construction used in conjunction with the hybrid adhesive 500. In various embodiments, one or both of the first and second substrates are made from polycyanurate material(s) such as polycyanurate composites. In some embodiments, the substrates are made of epoxies which are typically not activated by atmospheric plasma; this includes most high temperature epoxy resins utilizing a tetrafunctional epoxy and a high temperature amine such as diaminodiphenylsulphone (DDS).

The first and second epoxy layers 106, 116 may use any suitable epoxy. In various embodiments, the first and second epoxy layers are curable epoxy adhesives capable of activation by atmospheric plasma and more prone to plasma activation than the substrates 104, 114. In some embodiments, the first and second epoxy layers are elastomer modified epoxy resins, typically modified with a chemical structure incorporating carboxyl or carbonyl groups in their structure as observed in some commercially available toughened epoxies (e.g., Epon 58005, 58006). The film adhesive can be formulated with varying concentrations of a standard epoxy resin such as Bisphenol-A with the addition of a carboxyl terminated elastomer (e.g., Cytec FM 300 and FM 73).

The third epoxy layer material 110 is an epoxy adhesive suitable for joining the first and second epoxy layers. In an embodiment, the third epoxy layer consists of a room temperature curable epoxy adhesive.

Most types of polycyanurate composites ("prepregs") can be fabricated and/or laid-up in a configuration suitable for bonding in accordance with the present invention. The lay-up may be in a flat laminate, tube, clip, and/or any other configuration including those used in the manufacture of composite hardware.

In various embodiments, prepregs comprise one or more cyanate ester formulations (e.g., Tencate's RS3C, 1515, Hexcel 954-3, etc.). The prepreg may use any type of fiber(s) (e.g., carbon fibers, pan- or pitch-based glass fiber, and/or organic fibers) known to be suitable for use in the manufacture of composite hardware. A few examples of unbenefitted epoxy prepreg formulations include tetrafunctional commercial epoxy prepregs such as Tencate RS36, Hexcell M76, Hexcel 8552 and similar materials.

Figure 6:
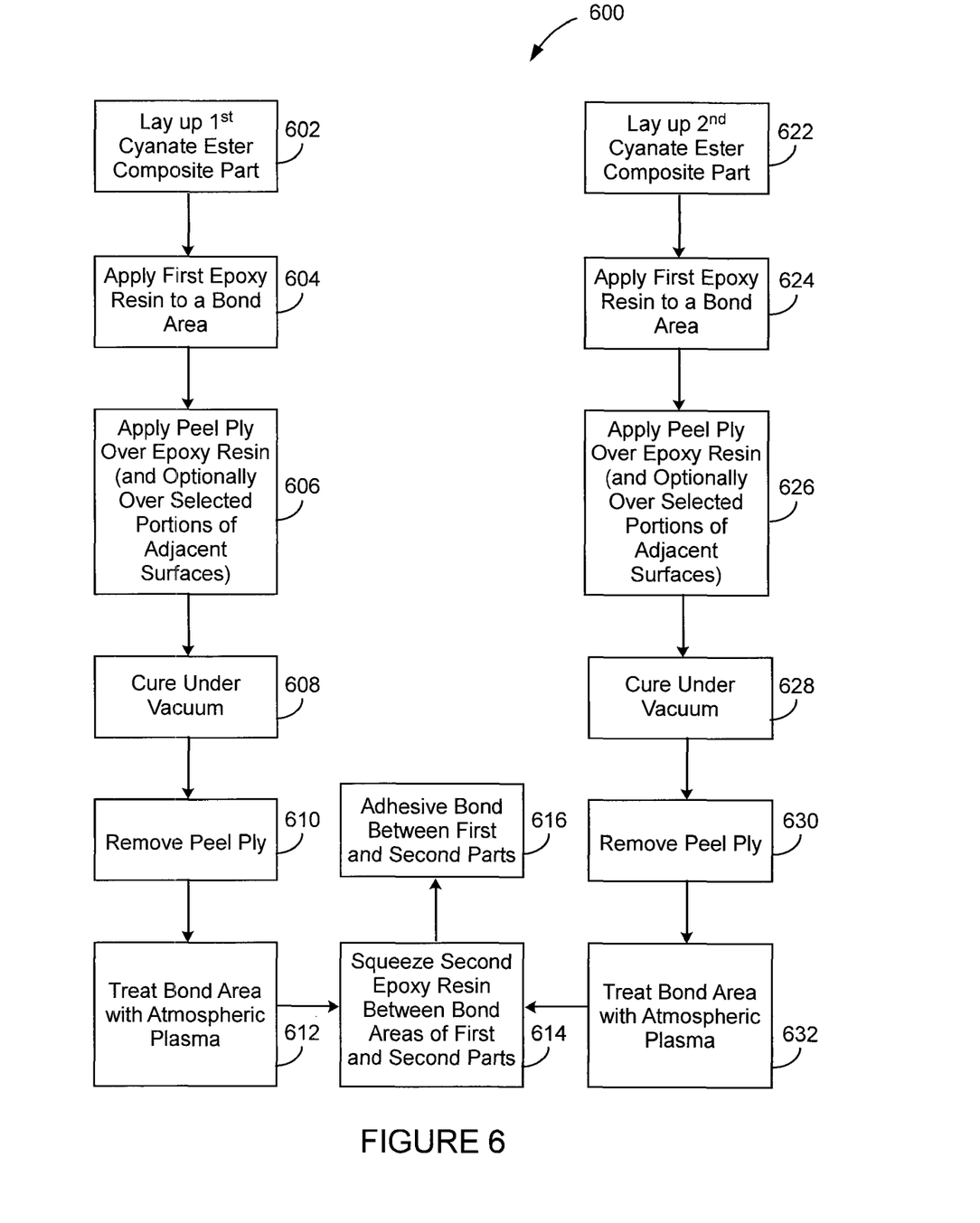
FIG. 6 shows a flowchart of steps for bonding two flat panels using a hybrid adhesive.

FIG. 6 is a flowchart describing steps for bonding two flat panels using a hybrid adhesive in accordance with the present invention 600. FIGS. 7A-D show typical part configurations corresponding to the steps of the flowchart 700A-D. Notably, this example illustrates a simple bonding configuration having a single lap bond. As persons of ordinary skill in the art will recognize, curved and other parts with complex shapes and/or multiple lap bonds can be joined using the techniques of the present invention.

In a first step, substrates to be joined are provided when first and second cyanate ester composite parts are laid up to make prepregs of the desired configuration 602, 622. After lay-up, a layer or film of epoxy resin is applied to a bond area of each substrate 604, 624. In various embodiments, the epoxy resin is applied as a thin coating or film that is placed over bond areas of the composite. In an embodiment, the film is about 1 mil thick. The epoxy resin used is more susceptible to enhanced bonding from plasma treatment than is the cyanate ester substrate. In some embodiments, the film is incorporated using a film adhesive meaning the resin is supplied by a manufacturer in a partially cured state in film configuration. In various embodiments, the film thickness varies from 1 to 10 mils. In some other embodiments, the film thickness varies from 0.2 to 50 mils. A few examples of commercial epoxy resin films are Cytec FM73, FM 300, and Scotchweld AF 163.

In various embodiments, the epoxy resin is applied as paste, sprayed on, or applied or located using another suitable method known to persons of ordinary skill in the art. And, in various embodiments, the epoxy resin is chosen to co-react with the cyanate ester and to be more prone to plasma activation than a host cyanate ester composite substrate. The resin film thickness should typically not exceed 10 mils because the plasma treatment depth is usually less than one micron.

A peel ply is then applied over at least the epoxy resin and in some embodiments to a greater extent 606, 626. In embodiments, the peel ply is applied over the epoxy resin layer and all or substantially all of the area of the adjoining surface. In an embodiment, a peel ply is placed over the entire outer surface prior to vacuum bagging. Any type of suitable peel ply can be used. For example, polyester type peel plies minimize contamination of the bonded surface and will likely be suitable in most applications. In some embodiments, a breather adjacent to the part is used to wick out any excess resin from the film adhesive.

Figure 7A:
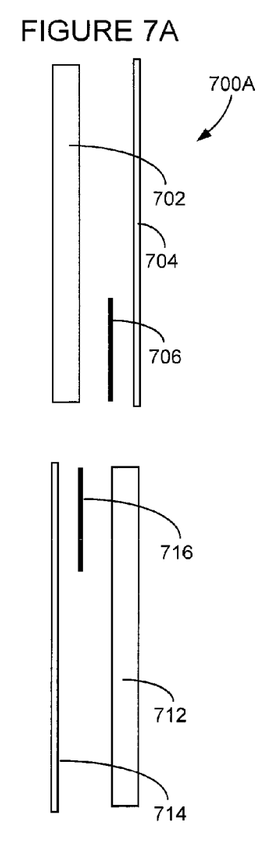
FIGS. 7A-D show typical part configurations corresponding to steps of the flowchart of FIG. 6.
Figure 7B:
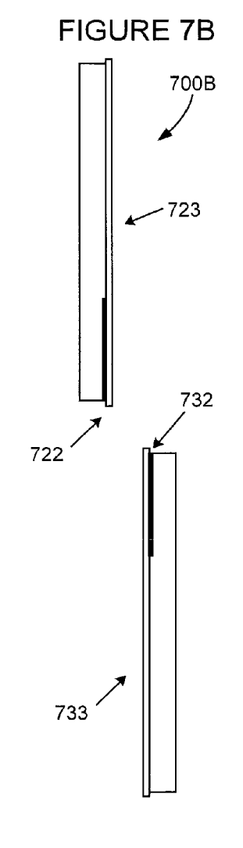

FIG. 7A shows the laid up substrates 702, 712, the epoxy layers 706, 716 and the peel plies 704, 714. As shown in this embodiment, each peel ply will cover a corresponding epoxy layer and all of the area adjoining the epoxy layer. FIG. 7B shows the epoxy layers applied to the substrates 722, 732.

In a vacuum cure step 608, 628, the assembled substrates 723, 733 are placed in an evacuable container such as a vacuum bag. In various embodiments, the cure of the part follows the manufacturer's specifications for the prepreg material chosen. In various embodiments, cure temperatures approach 125° C. for 2 hours, with a subsequent heat-up to 177° C. for 2 hours. In some embodiments, an intermediate hold is important to maximize the co-cure between the cyanate ester and the resin film. An intermediate hold temperature allows the material to diffuse and coreact prior to complete gelation. If gelation occurs too early the resin cannot diffuse and react sufficiently at the interphase. This intermediate temperature allows a decrease in viscosity of the resin without too much chemical reaction. Limiting chemical reaction prevents, in various embodiments, resin gelling and/or gel diffusion limitations. An exemplary 2-hour hold was selected for the system described in this example.

Fourier Transform Infrared Spectroscopy ("FTIR") and Dynamic Mechanical Analysis ("DMA") can be used to identify the time required for sufficient chemical reaction between the resin film adhesive and the cyanate ester to have occurred. Chemical interaction between both materials tends to show improved performance of final part properties. Flatwise tension tests are best suited to show the effect of cure profile on optimized co-reaction for optimized mechanical performance.

Figure 7C:
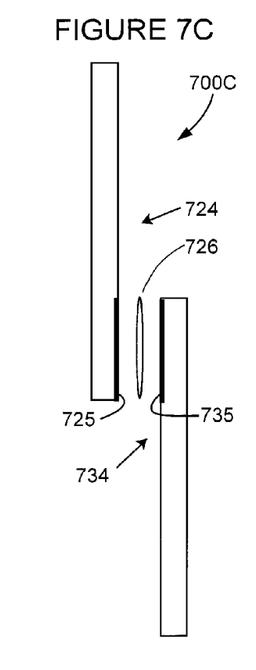

When the composites are cured, they are removed from the evacuated containment and the peel ply is removed 610, 630. These composites with the peel ply removed 724, 734 are shown in FIG. 7C. Notably, some peel plys may tend to leave a small degree of contaminants on the surface of the composite which may degrade mechanical performance.

Atmospheric plasma treatment of the exposed epoxy resin layers follows removal of the peel ply 612, 632. For example, 3 plasma treatment passes removes any signs of contamination and provides significant bond strength improvement. Suggested plasma conditions are: He flow rate 30 LPM, Oxygen flow rate 0.45 LPM, distance to substrate 1 mm, power 96 W using 13.56 MHz radio frequency, and scan rate 25 mm/sec. As a person of ordinary skill in the art will understand, these conditions may be adapted to suit differing conditions such as the geometry of the parts, the type and location of reinforcement, the application/environment of use, and other variables.

Additional plasma treatment passes increase the specific activated species levels as a function of the number of passes. However, the number of passes should typically be limited so as to avoid situations where composite matrix erosion is likely to occur. For example, the inventors found in one instance 24 passes marked the onset of matrix erosion. While the specific functional species concentration does not typically decay much with exposure time, it is recommended that the treated surfaces are bonded within 21 days of treatment to optimize the activation and minimize the potential for contamination.

Once the parts are treated, the surfaces 725, 735 can be bonded. In an embodiment, an assembly epoxy resin is located between the epoxy layer bond areas of the first and second substrates 726 as shown in FIG. 7C. Any suitable epoxy resin can be used for this purpose, for example an epoxy resin adhesive curable at room temperature such as Henkel EA 9394.

Figure 7D:
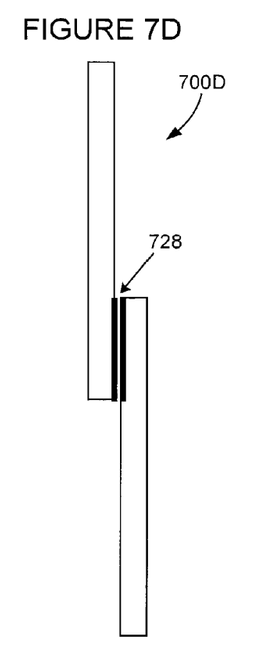

In step 614, squeezing the epoxy resin 726 between the bond areas of the substrates 725, 735 begins the formation of the assembly joint 728 shown in FIG. 7D. When the assembly epoxy resin is cured, the assembly joint is completed 616.

In operation, plasma treatment of composite materials tends to alleviate inconsistent bond performance typical of current surface preparation methods. In various embodiments atmospheric plasma treatment processes are non-contacting, require minimal operator intervention, and are applicable to complex shapes and selected areas of the composite surfaces. Additionally, it can be expected that secondary contamination will be greatly reduced compared to surface preparations that use conventional abrasion techniques.

On polymeric surfaces, plasma treatment involves the interaction of free radicals and ions with the treated specimen. Plasma treatment allows the surface chemistry and morphology of polymeric materials to be modified depending on the specific gas and conditions used for treatment. An important aspect of the treatment is that the material changes can be confined to a depth of a few nanometers, reducing the potential for damage to the reinforcement plies.

In some embodiments plasma treatment results in one or more physical processes including: ablation (cleaning by removing low molecular weight organic contaminants); etching (affecting the surface morphology of the substrate); crosslinking (interconnection of long chain molecules); and, surface activation (chemical bonding of reactive molecules with the substrate). And, in some embodiments, materials are treated with atmospheric plasma without using a chamber and the treatment is applied to specific areas of the substrate to be bonded rather than performing the treatment on the entire structure.

As explained above, plasma treatment of graphite/epoxy composites promotes the formation of activated chemical species on the surface of the laminate. The concentration of these species increases as a function of plasma treatment duration. The functional species react with epoxy resin adhesives yielding improved adhesive strength.

Figure 8A:
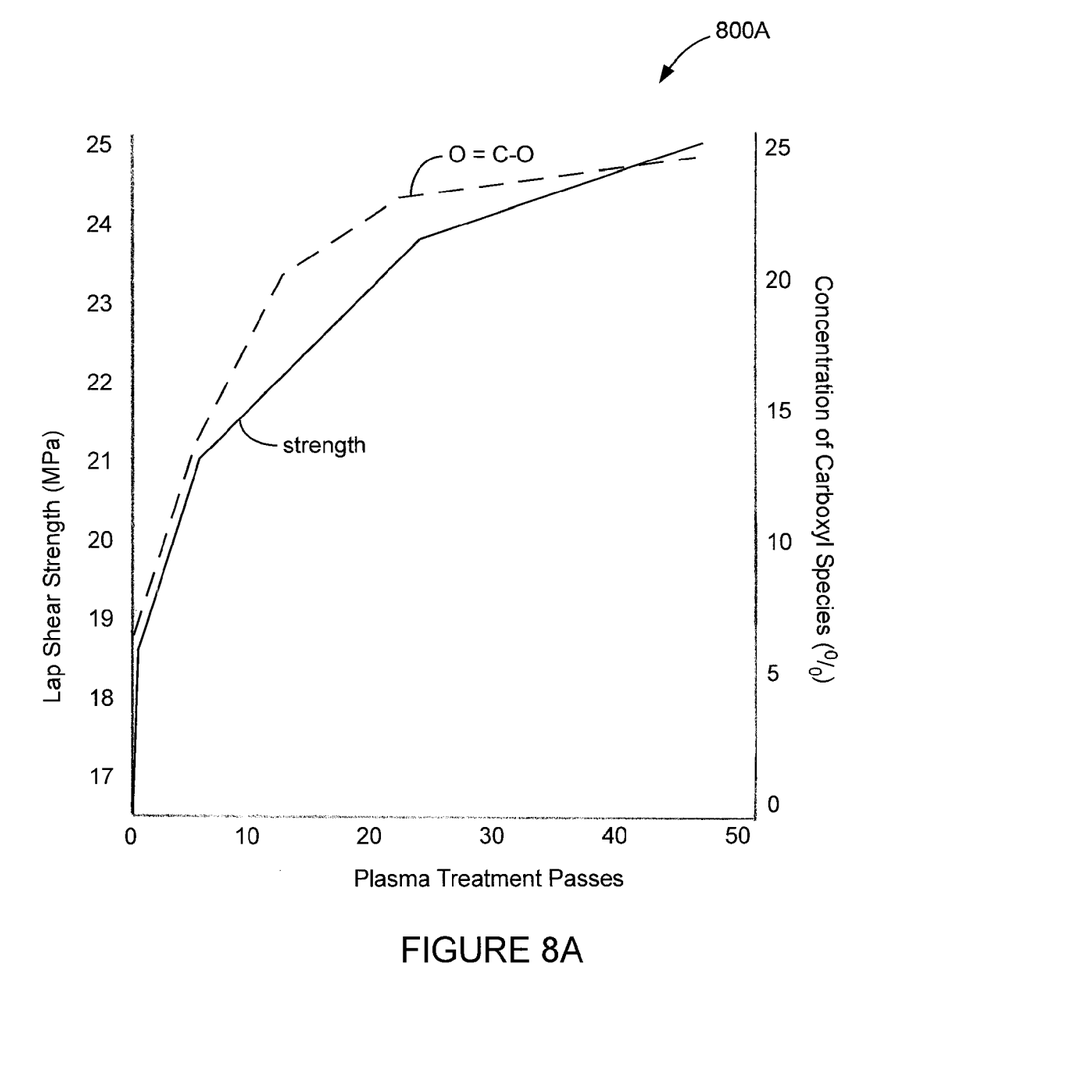
FIGS. 8A-B show graphs of lap shear strength of the hybrid adhesive.

Embodiments of the invention improve over conventional adhesives and adhesive systems. Improvements include those indicated by FIGS. 8-10. In particular, FIG. 8A shows lap shear strength and functional species concentration as a function of the number of atmospheric plasma treatment passes 800A. In an embodiment, the functional species is a carboxyl species (as shown). Notably, increased functional species concentration correlates with increased lap shear strength.

Figure 8B:
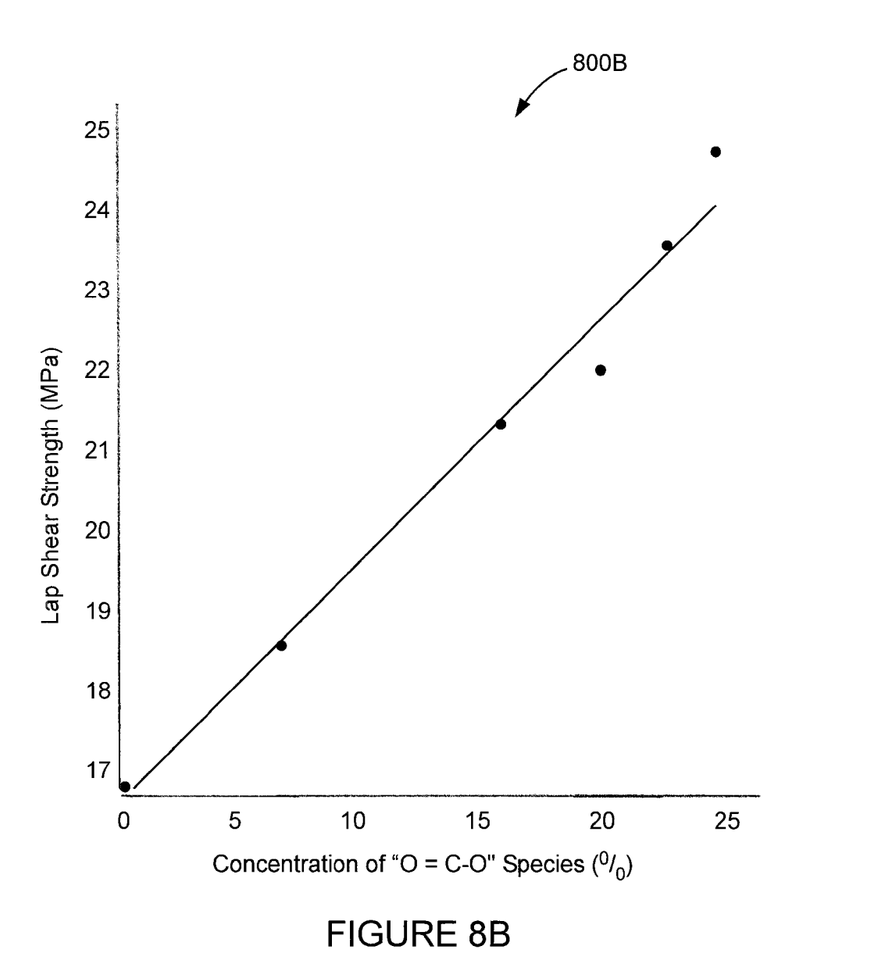

FIG. 8B shows the correlation between lap shear strength and the functional species concentration, shown here as a carboxyl species 800B. As can be seen, strength improves in a substantially linear fashion with increases in the concentration of the carboxyl species.

Figure 9:
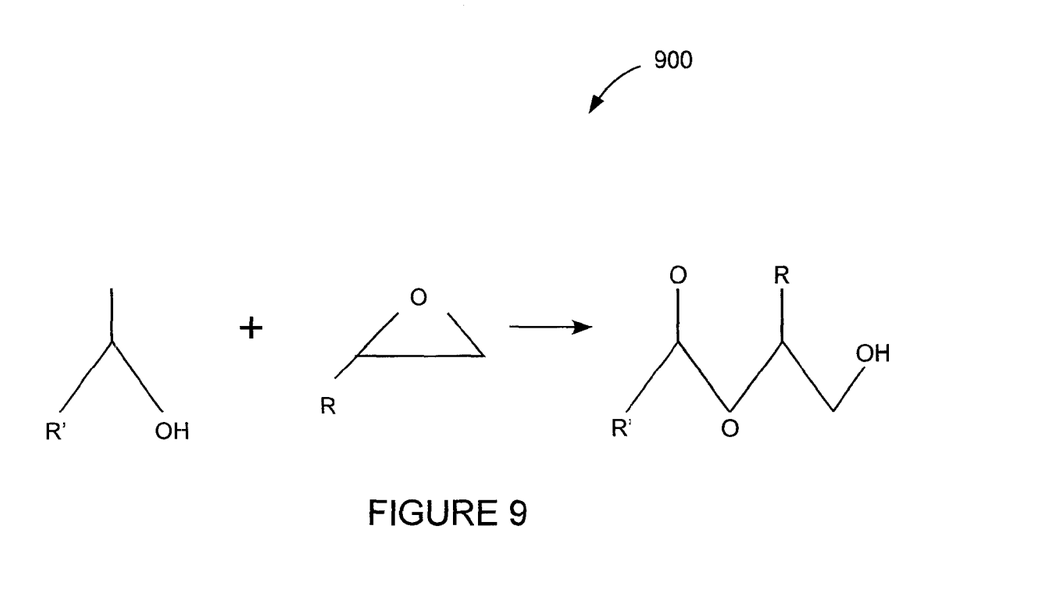
FIG. 9 shows a chemical reaction between a functional species and an epoxy group.

The inventors' experiments and analysis indicate the functional species is a carboxyl group. The reaction 900 between this functional species/carboxyl group and an epoxide group is shown in FIG. 9.

Figure 10:
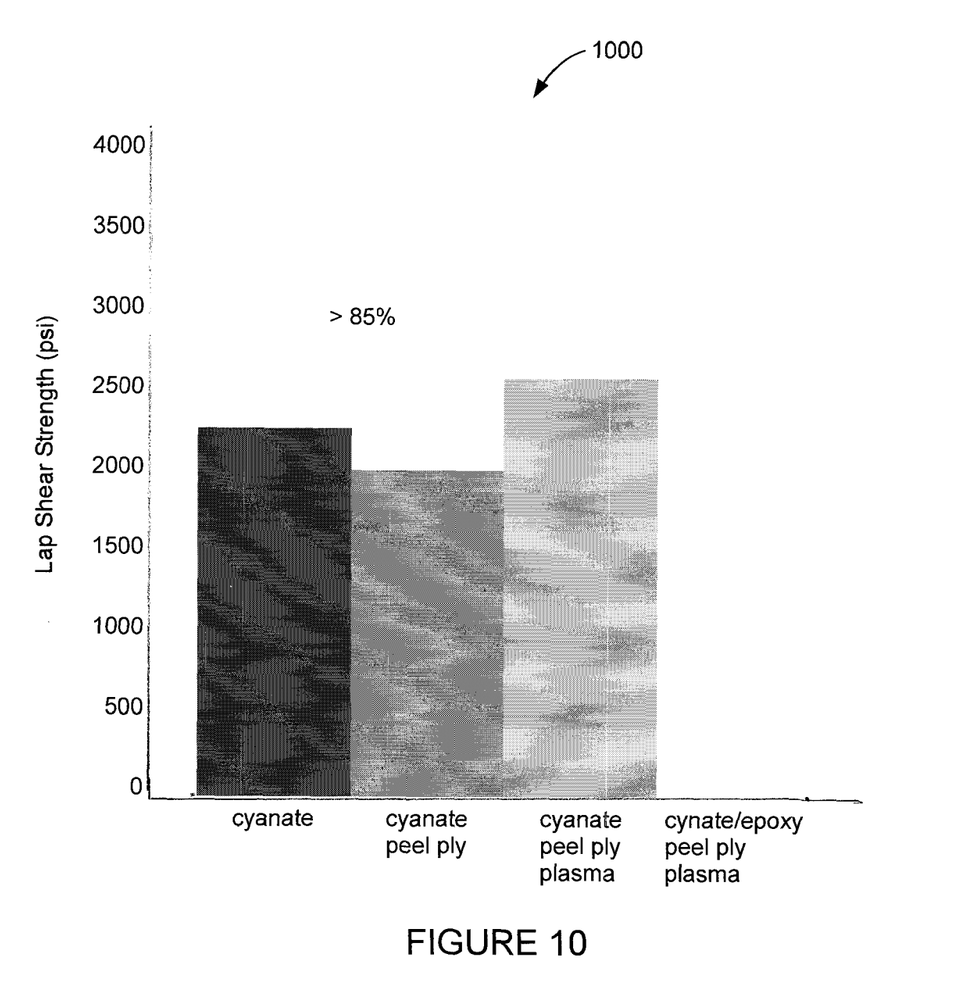
FIG. 10 shows a comparison of lap shear strength for cyanate and cyanate ester combinations.

FIG. 10 shows another graph of lap shear strength 1000. Here, improvements in lap shear strength are shown as a function of the type of surface treatment chosen. In particular, the hybrid cyanate/epoxy peel ply plasma combination as described above is seen to substantially outperform competing cyanate systems including cyanate systems treated with atmospheric plasma.

In various embodiments of the present invention, one or more of the following benefits can be observed: (a) the chemistry of the area to be bonded is altered so as to maximize the active species content (increase bond strength) on a system that would not otherwise benefit substantially from such a treatment; (b) polycyanurates can be co-cured with the new resin film and the resultant interface will be stronger than each of the unmodified systems alone; (c) the amount of the new resin film can be minimized because the majority of the plasma-treatment usually occurs in the sub-micron range; (d) after the surface is cured, the new modified resin composite surface will be more prone to generating activated species well above the concentration that a pure polycyanurate composite would be able to achieve; (e) only the localized areas used for bonding will have this modified co-cured activated film; (f) atmospheric plasma allows for localized treatment; (g) in addition, the majority of the composite will be a polycyanurate resin composite with all its inherent advantages; and, (h) the process for manufacturing these composites will not affected over typical composite manufacturing processes.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A method of making a hybrid adhesive system comprising the steps of:
   laying up first and second cyanate ester substrates;
   placing an epoxy layer on a bond area of each substrate;
   covering each bond area with a peel ply;
   curing the substrates in a heated, sub-atmospheric pressure environment;
   removing the peel ply;
   treating a surface of each epoxy layer with atmospheric plasma;
   forming an assembly joint by squeezing an assembly epoxy resin between the treated surfaces; and,
   curing the assembly epoxy resin.

2. The method of joining the parts of claim 1 further comprising the step of incorporating functional oxidized species with each epoxy layer.

3. The method of joining the parts of claim 2 wherein the functional oxidized species includes a carboxyl group.

4. The method of joining the parts of claim 3 wherein the step of curing includes curing the substrates and the cyanate-epoxy bonds.

5. The method of joining the parts of claim 4 further comprising the step of adjusting the time the films are exposed to the atmospheric plasma to vary the strength of the assembly joint.

6. The method of joining the parts of claim 5 wherein the step of covering the bond areas with peel ply includes covering areas adjacent to the bond areas with peel ply.

7. The method of making the hybrid adhesive system of claim 1 further comprising the step of making the epoxy layers coextensive with respective bond areas.

8. The method of making the hybrid adhesive system of claim 1 further comprising the step of excluding non-functional particulate modifier from the assembly joint.

9. The method of making the hybrid adhesive system of claim 1 wherein heating the substrates during curing and use of atmospheric plasma are pre-bond conditioning steps.

10. A hybrid adhesive method comprising the steps of:
    providing uncured first and second cyanate ester substrates;
    placing an epoxy layer on a bond area of each substrate, the epoxy layers coextensive with respective bond areas;
    covering each bond area with a peel ply;
    curing the substrates;
    removing the peel ply;
    treating a surface of each epoxy layer with atmospheric plasma;
    forming an assembly joint by squeezing an assembly epoxy resin void of non-functional particulate between the treated surfaces; and,
    curing the assembly epoxy resin.

11. A method of making a hybrid adhesive system comprising the steps of:
    laying up first and second composite substrates;
    placing an epoxy layer on a bond area of each substrate;
    covering each bond area with a peel ply;
    curing the substrates in a heated, sub-atmospheric pressure environment;
    removing the peel ply;
    treating a surface of each epoxy layer with atmospheric plasma;
    forming an assembly joint by squeezing an assembly epoxy resin between the treated surfaces; and,
    curing the assembly epoxy resin.

* * * * *